(12) United States Patent
Grundmeier

(10) Patent No.: US 8,008,589 B2
(45) Date of Patent: Aug. 30, 2011

(54) ELECTRICAL SWITCHING DEVICE IN A MOTOR VEHICLE HAVING AN ANTI-ESD DEVICE

(75) Inventor: Juergen Grundmeier, Argenschwang (DE)

(73) Assignee: Delphi Technologies, Inc., Troy, MI (US)

( * ) Notice: Subject to any disclaimer, the term of this patent is extended or adjusted under 35 U.S.C. 154(b) by 215 days.

(21) Appl. No.: 12/287,898

(22) Filed: Oct. 14, 2008
(Under 37 CFR 1.47)

(65) Prior Publication Data
US 2009/0277760 A1 Nov. 12, 2009

(30) Foreign Application Priority Data

Oct. 15, 2007 (EP) ................................... 07020108

(51) Int. Cl.
*H01H 9/02* (2006.01)
*H01H 13/04* (2006.01)
*H01H 19/04* (2006.01)
*H01H 21/04* (2006.01)

(52) U.S. Cl. ........................................ 200/305; 361/216
(58) Field of Classification Search ................. 200/305, 200/304, 61, 54; 361/212, 216, 217, 220
See application file for complete search history.

(56) References Cited

U.S. PATENT DOCUMENTS

| 4,456,800 A * | 6/1984 | Holland ....................... 200/305 |
| 4,570,200 A * | 2/1986 | Osada et al. ................. 361/212 |
| 5,283,710 A | 2/1994 | Hamilton et al. |
| 5,408,062 A | 4/1995 | Agnatovech |
| 6,421,221 B1 | 7/2002 | Thomason et al. |
| 2004/0118669 A1 * | 6/2004 | Mou ............................ 200/310 |

FOREIGN PATENT DOCUMENTS
WO 2004/065926 8/2004

OTHER PUBLICATIONS
European Search Report dated Mar. 18, 2008.
* cited by examiner

*Primary Examiner* — Felix O Figueroa
(74) *Attorney, Agent, or Firm* — J Gordon Lewis

(57) ABSTRACT

An electrical switching device in a motor vehicle includes an anti-ESD device which is formed by a metallic or metal-coated element on a surface of the switching device, with which an earth connection is associated via a defined air gap.

16 Claims, 3 Drawing Sheets

ELECTRICAL SWITCHING DEVICE IN A MOTOR VEHICLE HAVING AN ANTI-ESD DEVICE

TECHNICAL FIELD

The present invention relates to an electrical switching device for application in a motor vehicle having an anti-ESD (electrostatic discharge) device.

BACKGROUND OF THE INVENTION

Modern motor vehicles have a large number of electrical or electronic switching devices which are actuated by a user for controlling a desired function. For example, pressure switches, toggle switches or the like on the dashboard of the motor vehicle as well as on steering column or steering wheel switches are known, for example for controlling a direction indicator or a windscreen washer system. If such a switching device is actuated, usually an electrical circuit is closed or a corresponding control signal is forwarded to a corresponding control device of the motor vehicle, which in turn controls the actual desired function.

In the process there frequently arises the problem that the user or his fingertip is electrostatically charged and this electrical charge is transferred to the switching device upon touching the latter. In the process there can be an electrostatic discharge (ESD for short). Even with an electrically insulating material, for example, a plastic surface of the electrical switching device, a spark can arise, which penetrates through the material and causes in the switching device a short creating a high electrical current pulse. Particularly in the case of delicate electrical or electronic switching devices, this can lead to damage.

To protect electrical switching devices, various solutions are known. DE 10 2004 027 278 A1 describes a protective circuit with a semiconductor substrate, active components such as, for example, transistors being contained in the semiconductor substrate. DE 10 2005 027 368 A1 discloses a protective semiconductor structure for an electrostatic discharge with two bipolar transistors between which the electrostatic charge is conducted back and forth in order to reduce it. Lastly, from DE 10 2004 052 093 A1 is known a circuit assembly which consists of two sections, each with its own operating voltage and a transistor. These solutions are, however, disadvantageous insofar as they require considerable expenditure on circuitry and introduction of the electrostatic charge into the circuit itself is likewise not reliably guaranteed.

Furthermore it is known from practical experience that an anti-ESD device can be formed by a labyrinth in the gap region between an actuating element and a housing of switching devices, the labyrinth being intended to prevent penetration of a spark into the interior of the switching device.

SUMMARY OF THE INVENTION

It is the object of the invention to provide an electrical switching device of the kind mentioned hereinbefore, which affords improved protection against electrostatic discharge and yet has a simple construction.

According to the invention, the object is achieved by the fact that the anti-ESD device is formed by a metallic or metal-coated element on a surface of the switching device, with which an earth connection is associated via a defined air gap.

A concept of the invention consists in providing on a surface of the electrical switching device an electrically conductive element, in particular a metallic element. Naturally, it can also be for example an element made of a plastic with a metal-coated, that is, electrically conductive surface. Usually, a surface of an electrical switching device is formed by plastic components, in particular a housing as well as at least one actuating element mounted therein, as a result of which an electrical charge at a fingertip of the user is, due to the higher electrical conductivity, always transferred to the metallic element and does not penetrate the plastic surface. In addition, on or in the electrical switching device is provided an earth connection which can be designed as desired and via which the electrical charge is carried away in a focused manner. Therefore damage to the actual electrical or electronic switching device is effectively avoided, as the charge is not introduced into a delicate circuit of the electrical switching device. The earth connection, which is preferably designed as described below, is separated from the metallic element by a defined air gap, in particular the width of this air gap being selected by the expert as a function of the quantity of the electrical charge to be expected which is transferred to the element. At this air gap, the distance between the earth connection and the metallic element is at its shortest, so that the electrical charge jumps in a defined manner from the metallic element across the air gap to the earth connection, and only at this air gap.

The metallic element reliably guarantees that no electrical charge penetrates for example a plastic surface of the electrical switching device uncontrolled and damages a circuit. The additional arrangement of the metallic element as well as the earth connection separated therefrom by an air gap of defined width requires hardly any additional expenditure in the manufacture of the electrical switching device.

Preferably, the metallic or metal-coated element is a ring which contains in particular chromium material. Appropriately, the ring is designed as a decorative ring surrounding an actuating element of the switching device. The ring continuously encompasses an actuating surface of the switching device formed by at least one actuating element, so that in practically any positions of a user's finger for actuating the switching device it is always ensured that any electrical charge is reliably introduced into the metallic element. Of course, a high-conductivity metal is preferred for this purpose, for example this can be in the form of a chromium ring or chrome-plated ring which also has an attractive appearance.

Alternatively, the object is achieved in an electrical switching device in a motor vehicle with a housing and/or an actuating element and an anti-ESD device by the fact that the anti-ESD device is produced by an earth grounded, electrically conductive housing and/or actuating element.

On the basis of this measure too, an electrical charge at a user's fingertip does not penetrate the plastic surface uncontrolled due to the higher electrical conductivity, but is diverted by the earth connection of the electrically conductive housing or actuating element in a focused manner, effectively avoiding damage to the actual electrical or electronic switching device.

In one embodiment, carbon nanotubes are mixed with the plastic of the housing and/or actuating element. Carbon nanotubes, also referred to as CNT, are microscopically small tubular structures for improving the mechanical and electrical properties of plastics.

According to a development, the earth connection is formed by a mechanical labyrinth in which the electrical charge moves to and fro and so is reduced. Such a mechanical solution can be designed in particular using carbon nanotubes in order to reduce the electrical charge slowly. Similarly, a pressed metallic screen can serve as the labyrinth.

Alternatively, an earth connection is associated with the housing and/or actuating element via a defined air gap. This embodiment which has already been described leads to the electrical charge jumping in a defined manner from the conductive housing or actuating element across the air gap to the earth connection.

Appropriately, the air gap is formed between the element, the housing and/or the actuating element on the one hand and an earth grounded conductor inside the housing on the other hand. A spark or charge jumps preferably between two conductors, on account of which the conductor inside the housing forms a kind of lightning conductor which takes up and conducts away in a focused manner the energy introduced into the switching device. Preferably, the conductor is connected to a printed circuit board of the switching device. The printed circuit board is connected to earth.

In a first embodiment, the earth connection is constructed by a connection of the ring, housing and/or actuating element and/or conductor to an earth connection of a battery of the motor vehicle, in particular via the body or the like metal parts. That is, there is a direct connection to the body of the motor vehicle. For this purpose the electrical conductor can protrude via a corresponding connection out of the electrical switching device and be connected to the body or earth. Inside the electrical switching device the air gap of defined width is then formed by a gap between the conductor and the annular metallic element or the housing and/or actuating element.

In an alternative embodiment, the earth connection is produced by a connection of the ring, housing and/or actuating element or conductor to electrical components, in particular diodes and/or transistors. These electrical components such as diodes, transistors or the like which are arranged inside the electrical switching device can be wired together by the expert in such a way that an electrical charge which has jumped across the defined air gap to this circuit earth connection is reduced in the earth connection without damaging further electrical components of the electrical switching device.

The electrical switching device described above can be used to control any functions in the motor vehicle and include any individual switches with corresponding actuating elements on the dashboard of the motor vehicle. Preferably, the electrical switching device is designed as a switching lever of a steering column switch. Actuation of the steering column lever or of the electrical switching device arranged thereon by the user is possible without the risk of an electrostatic discharge. But basically, an electrical switching device of this kind can also be used in all other fields of technology.

It goes without saying that the characteristics mentioned above and those yet to be described below can be used not only in the respective given combination, but also in other combinations. The framework of the invention is defined only by the claims.

BRIEF DESCRIPTION OF THE DRAWINGS

FIG. 1 is a perspective view of a switching lever of an electrical switching device according to the invention with front opening, FIG. 2 is a perspective view of the switching lever of the switching device as in FIG. 1 without actuating elements, FIG. 2A is a partial cross-section of the switch lever of FIG. 2 on an enlarged scale illustrating nanotubes mixed with plastic forming the switch housing, and FIG. 3 is a perspective partial view of the switching lever of the switching device as in FIG. 1.

DESCRIPTION OF THE PREFERRED EMBODIMENT

Figure 1:
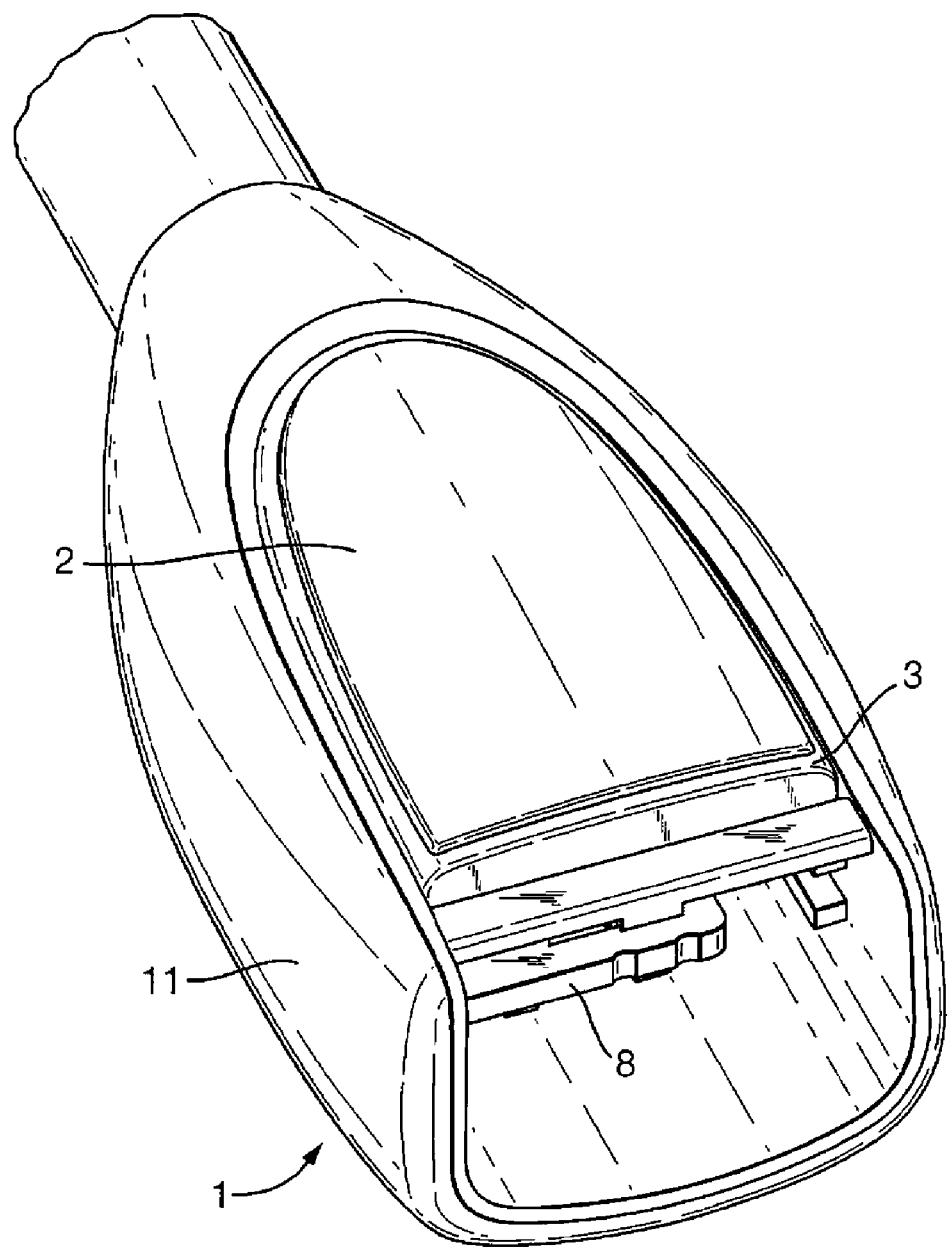
Referring to FIGS. 1-3, the invention is described in more detail below with the aid of a practical example with reference to the drawings. They show.

Referring to FIGS. 1, 2, 2A and 3, the switching lever 1 of the switching device 4 which serves to control any functions is usually arranged in the region of a steering wheel of a motor vehicle, and has an actuating element 2 mounted in a housing 11 for switching on and off a cruise control system, for example. If a user of the motor vehicle acts on the actuating element 2 which is made of plastic, an electrical charge can be transferred from his fingertip via the actuating element 2 to electrical switching elements 10 inside the switching lever 1 and damage them if there is no device for protection against an electrostatic discharge (ESD).

For this purpose the switching lever 1 or the electrical switching device 4 has a metallic element in the form of a chrome-plated ring 3. The ring 3 substantially continuously surrounds the actuating element 2 in order always to ensure, regardless of the position of the fingertip, that an electrical charge is transferred from the fingertip to the ring 3, as the latter has a higher electrical conductivity than plastic.

Figure 2:
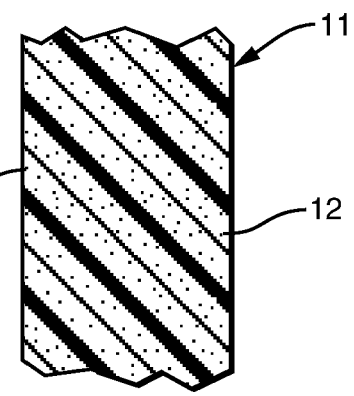
Figure 2:
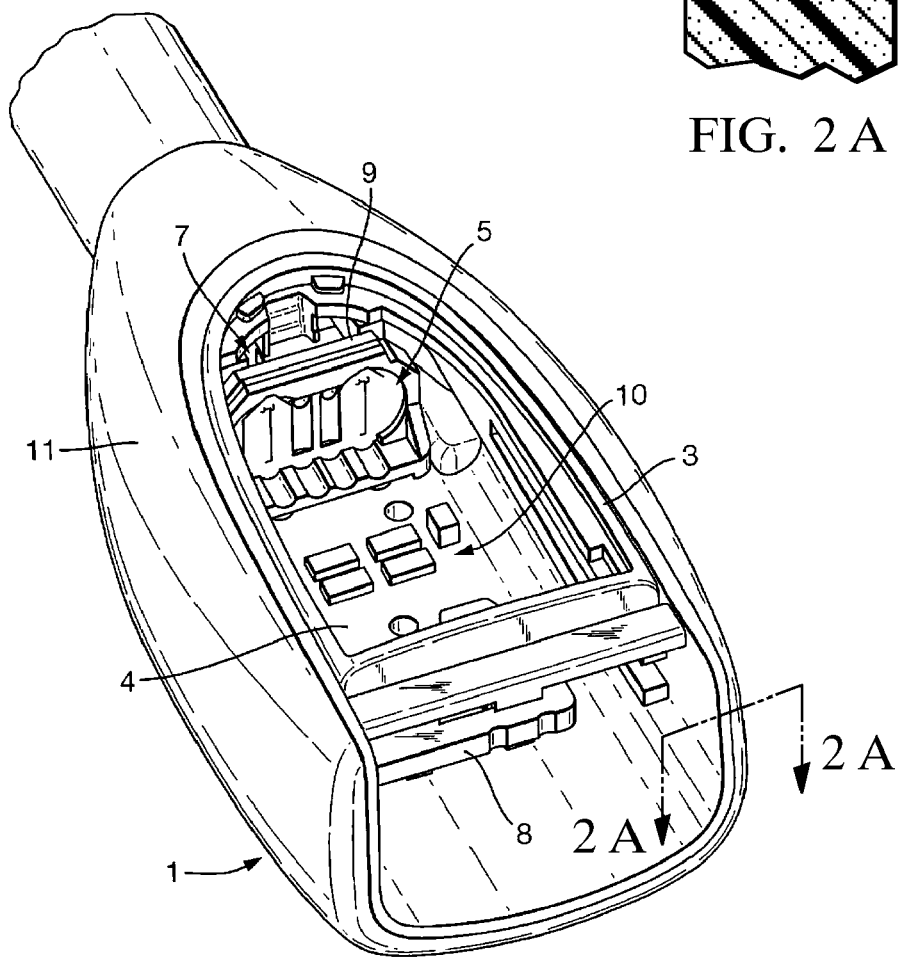
Figure 3:
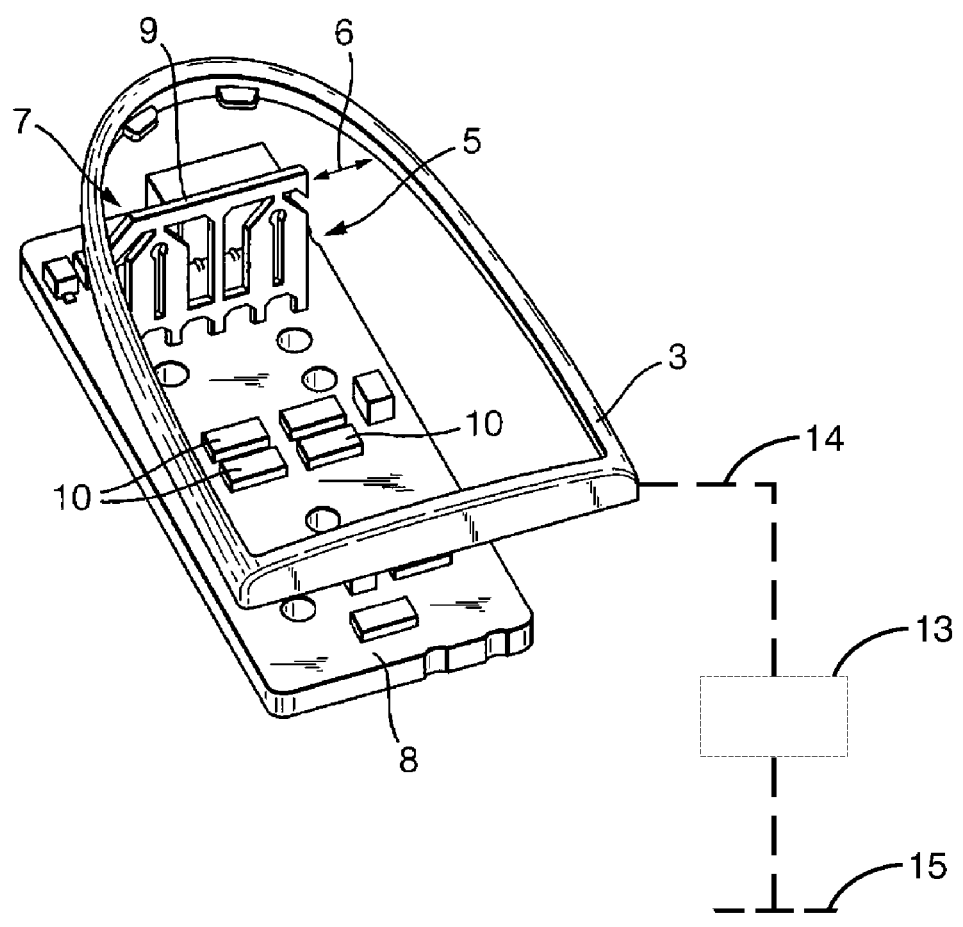

Furthermore, inside the switching lever 1 or electrical switching device 4 is provided an earth connection 7 which is separated from the ring 3 by an air gap of defined width according to the double arrow 6, and which includes a conductor 9 connected to a printed circuit board 8 of the switching device 4. The earth connection 7 can be formed by electrical components such as diodes or transistors, by a direct electrical connection to the body of the motor vehicle or, as shown in FIGS. 2 and 3, by a mechanical labyrinth 5 in which the electrical charge moves to and fro until it is reduced. The labyrinth 5 can be formed by a pressed metallic screen which is cast integrally in the actual electrical switching device 4.

The air gap according to the double arrow 6 ensures that the electrical charge transferred from the user to the ring 3 jumps in a defined manner at this air gap 6, which forms the shortest distance between the conductor 9 of the earth connection 7 and the ring 3, from the latter to the earth connection 7 or the mechanical labyrinth 5. Thus damage to the actual electrical switching device 4 with its switching elements 10 and, if any, further electrical/electronic components by an electrostatic discharge is reliably prevented, as the electrical charge is carried away from the ring 4 via the earth connection 7.

Referring to FIG. 2A, the housing 11 can be formed of a mixture of plastic material and nanotubes 12. Referring to FIG. 3, the chrome-plated ring 3, housing or actuating element can be connected to earth 15 through electrical components 13 such as diodes and/or transistors and an electrical conductor 14.

The invention claimed is:

1. An electrical switching device adapted for use in a motor vehicle and comprising:
   a housing assembly including a housing member, an electrical switching device disposed within said housing member and an actuating element having an exposed outer surface and operatively engaging said electrical switching device to alter the electrical state thereof in response to tactile operator activation;
   an electrically conductive ring member substantially circumscribing the perimeter of said exposed outer surface;

a conductor fixedly disposed within said housing member in spaced proximity to a segment of said ring member, establishing an air gap therebetween; and means in-circuit with said conductor operative to dissipate an electrostatic charge received from a vehicle operator through said conductive ring, said air gap, and said conductor.

2. The electrical switching device of claim 1, wherein said air gap is substantially fixed.

3. The electrical switching device of claim 1, wherein said conductive ring is fixedly carried with said housing member.

4. The electrical switching device of claim 1, wherein said conductive ring is fixedly carried with said actuating element.

5. The electrical switching device of claim 1, wherein said electrostatic charge dissipation means comprises a mechanical labyrinth disposed within said housing member.

6. The electrical switching device of claim 1, wherein said electrostatic charge dissipation means comprises means electrically interconnecting said conductor with an associated motor vehicle chassis ground.

7. The switching device of claim 1, wherein the ring member contains chromium.

8. The switching device of claim 7, wherein the ring member comprises a decorative ring surrounding said actuating element.

9. The switching device of claim 1, wherein said housing and/or actuating element comprises carbon nanotubes mixed with plastic.

10. The electrical switching device of claim 1, comprising an earth connection formed by a mechanical labyrinth.

11. The switching device of claim 10, wherein the earth connection is associated with the housing and/or actuating element via said air gap.

12. The switching device of claim 11, wherein the air gap is formed between the actuating element and the housing or an earthed conductor inside the housing.

13. The switching device of claim 1, wherein the conductor is connected to a printed circuit board of the switching device.

14. The switching device of claim 10, wherein the earth connection is constructed by a connection of the ring, housing and/or actuating element and/or conductor to an earth connection of a battery of the motor vehicle, in particular via the body or the like metal parts.

15. The switching device of claim 10, wherein the earth connection is produced by a connection of the ring, housing and/or actuating element and/or conductor to electrical components, in particular diodes and/or transistors.

16. The electrical switching device of claim 1, wherein the electrical switching device is designed as a switching lever of a steering column switch.

* * * * *